April 1, 1952 — C. SEKELY — 2,591,620
GRASS SHEARS
Filed Jan. 21, 1948
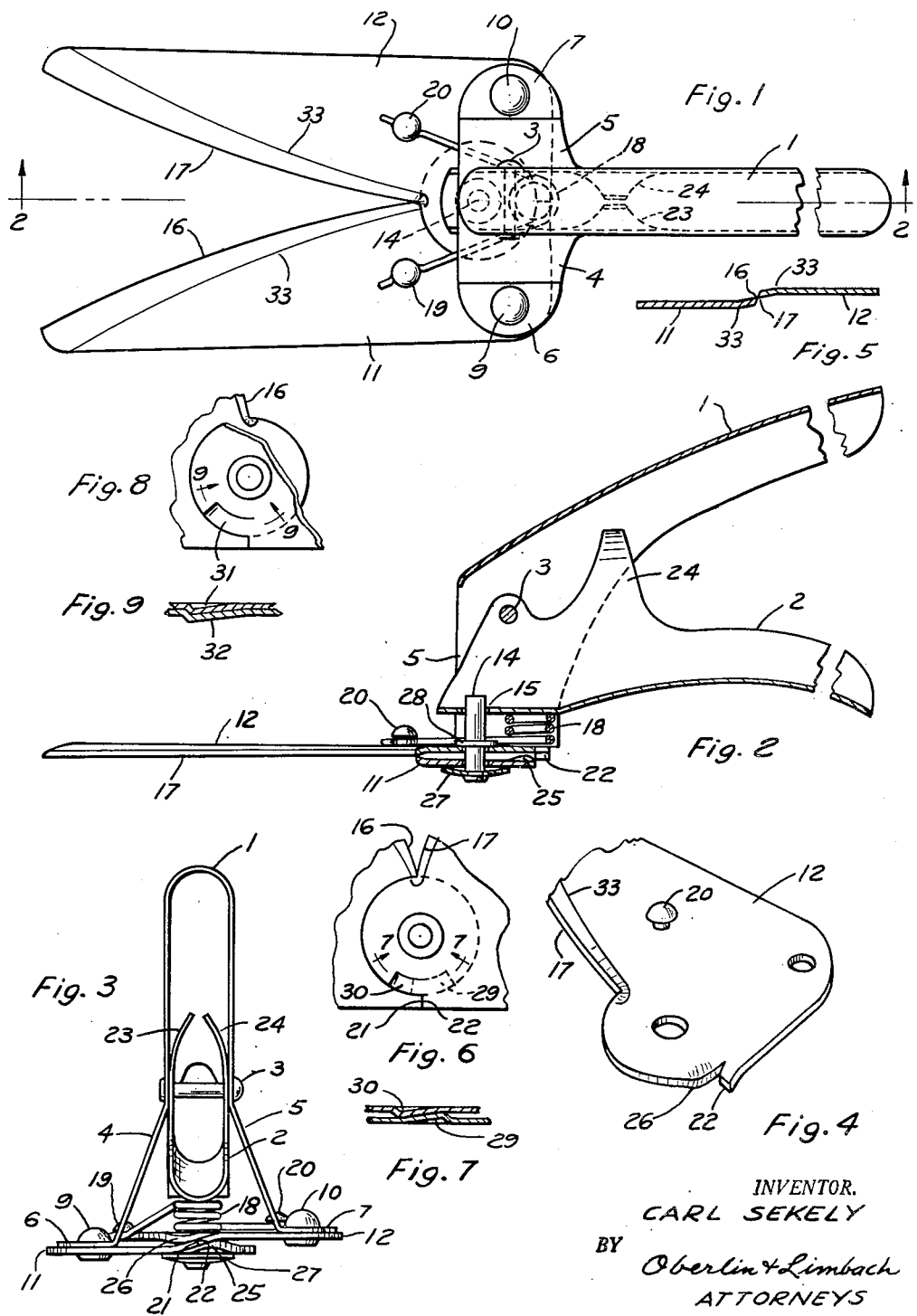
INVENTOR.
CARL SEKELY
BY Oberlin & Limbach
ATTORNEYS Patented Apr. 1, 1952

2,591,620

UNITED STATES PATENT OFFICE 2,591,620

GRASS SHEARS

Carl Sekely, Salem, Ohio

Application January 21, 1948, Serial No. 3,534

2 Claims. (Cl. 30—248)

The present invention while relating generally, as indicated, to shears, is more especially concerned with certain improvements in a hand-type shears (commonly called "grass shears") in which the cooperating cutting blades and actuating handles therefor lie in planes substantially perpendicular to one another, such shears having utility in clipping grass and the like.

It is a primary object of this invention to provide a shears of the character indicated which is not only of such simple form as to be capable of being economically manufactured but is such form that the necessity of frequent sharpening or adjustment of the same is avoided.

Another object is to provide shears having a novel form of cutting edge on each of the blades thereof whereby the cutting edges engage one another in point contact, providing clearance except at the immediate point of engagement, such edges being additionally formed so as to impart longitudinal rigidity to the blades of the shears.

Another object is to provide cooperating cams on the blades so that the cutting edges thereof are positively urged against one another during closing of the blades, such cam action making possible a very efficient shearing action.

Another object is to provide a unique handle stop mechanism which obviates pinching of the hand of the user therebetween and which may be readily adjusted to compensate for wear and deformation of parts of the shears.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a top plan view of one embodiment of the present invention;

Fig. 2 is a vertical cross-section view substantially along the line 2—2, Fig. 1;

Fig. 3 is an end elevation view as viewed from the righthand end of Fig. 2;

Fig. 4 is a fragmentary perspective view of one of the two cutting blades employed in the shears illustrated in Figs. 1 and 2;

Fig. 5 is a cross-section view transversely of the blades, showing the same as engaged during a cutting stroke;

Fig. 6 is a top plan view illustrating the rear end portions of a pair of blades having a modified form of cam arrangement thereon;

Fig. 7 is a detail cross-section view taken substantially along the arcuate line 7—7, Fig. 6;

Fig. 8 is a view similar to Fig. 6 except illustrating a still further modification; and Fig. 9 is a detail cross-section view taken substantially along the line 9—9, Fig. 8.

Referring now to the drawing, and first more especially to Figs. 1–5, there is illustrated therein one embodiment of the present invention which comprises a pair of longitudinally extending handles 1 and 2 pivotally connected to one another at their forward ends as by a horizontally disposed pin 3, said handles being preferably formed as by stamping and drawing operations from relatively light-gauge sheet metal and shaped as shown to impart sufficient rigidity and strength thereto and to provide smooth hand grips.

The upper handle 1 is formed at its forward end with downwardly diverging legs 4 and 5 which terminate in substantially horizontally disposed feet 6 and 7, said leg 4 being slightly longer than said leg 5 for a purpose which will become apparent from the ensuing description.

Pivotally connected to the feet 6 and 7 as by rivets 9 and 10 are the rear ends of a pair of horizontally disposed cutting blades 11 and 12, said blades being pivotally connected to one another about a vertically disposed post 14 which is preferably located forwardly of the handle pivot pin 3 and the rivets 9 and 10. The upper end of post 14 loosely projects through an opening 15 in the lower handle 2.

It is now apparent that when said handles 1 and 2 are squeezed together, said post 14 will be drawn rearwardly to thereby effect pivoting of the blades about the rivets 9 and 10 so that their forwardly diverging cutting edges 16 and 17 respectively will close over one another.

In order to open the blades to the position shown in Fig. 1 in response to the release of squeezing pressure on the handles 1 and 2, there is associated with the blades a torsion spring 18 having forwardly extending legs which are hooked over rivets 19 and 20 on said blades. The rear ends of the blades are formed with conventional inter-engaging stop shoulders 21 and 22 for limiting the opening movement of the blades.

Having thus described a well-known construction of grass shears, reference will now be made to the specific improvements which constitute the present invention.

One of the aforesaid improvements is a novel form of handle stop means which is so enclosed within the upper handle 1 as to obviate the possibility of the user's hand being pinched incidental to the use of these shears. An illustrative handle stop means comprises forming the lower handle 2 with upward projections 23 and 24, the laterally spaced upper edges of which projections are adapted to engage with the underside of the upper handle 1 when the handles are squeezed together. By reason of the downwardly and transversely curved cross section of said upper handle, such projections will be cammed toward one another to thus provide a slight yielding action following engagement of said projections with the upper handle. Furthermore, in the event that the tips of the blades do not come together or do not cross over one another, as is desired when the handles are squeezed together, the handles may be firmly squeezed (by hand, or in a vise or the like) to effect buckling of said projections 23 and 24 and thereby provide a quick and convenient adjustment of the stop means without requiring any adjusting screws or the like or without requiring the user to saw or file the end of the conventional stop pin which is usually provided at or near the rear ends of one of the handles.

Another important improvement is the provision of cam means for positively urging the blades 11 and 12 together during their closing movement so as to obtain an efficient cutting action. The improved cutting action obtained thereby makes the present shears more universal and thus suitable for many tasks other than merely clipping grass and the like.

As best shown in Figs. 2 to 4, one manner of effecting camming of the blades together as aforesaid comprises deforming the peripheral area 25 of the lower blade 11 toward the upper blade 12 and the peripheral area 26 of the upper blade 12 toward the lower blade 11. Now, when the handles 1 and 2 are squeezed together to draw the post 14 rearwardly and to cause pivoting of the blades about the rivets 9 and 10, the inter-engagement of the areas 25 and 26 on said blades will cause the cutting edges 16 and 17 of the blades to engage one another during the entire closing movement of the blades, such engagement being at a point migrating toward the tips of the blades, as will appear from the ensuing description.

It is further to be noted that in each instance, although the rearward drawing of the post 14 by squeezing together of the pivotal handle members 1 and 2, tends to tilt the post rearwardly, this tendency is offset by the action of the cams in separating the rear ends of the blades whereby to impose an opposing force on the post tending to tilt the latter forwardly. Thus, there is a stabilizing action in addition to that provided by the spring washer 27.

The washer 27 riveted to the lower end of post 14 is relatively large in diameter and is preferably of cupped or dished cross section as shown so as to exert a yieldable clamping force for holding the blades closely adjacent one another at their rear ends between said washer and the collar 28 on said post, such yielding being operative to take up wear and looseness occasioned by use of the shears. In addition, the large diameter of said washer 27 has a stabilizing action in keeping the blades in horizontal planes laterally thereof while they are being tilted longitudinally during the cutting stroke, as explained above.

In the event that it is desirable to provide surface contact between the cams of the blades, as shown in Figs. 6 and 7, each blade may be embossed as at 29 and 30 to provide planar wedge surfaces of arcuate contour. It will be apparent that during the closing of the blades, the embossed areas will engage one another in a surface contact to thereby minimize the unit pressure therebetween.

A further modification in the cams is illustrated in Figs. 8 and 9 wherein the embossed areas 31 and 32 on the respective blades are such that the blades may be initially closely adjacent one another when the blades are open. In the other forms of cams the blades must initially be spaced apart a certain amount.

With any of the camming arrangements disclosed the blades can be fabricated from flat stock and need not be arched longitudinally as in prior art shears. The cam surfaces 25—26, 29—30, and 31—32 effect progressive separation of the rear ends of the blades about the post 14 as a fulcrum whereby the cutting edges 16 and 17 will be caused to continuously engage one another. Furthermore, the camming action herein obtained is positive so as to provide a very efficient cutting action of the blades.

A still further improvement in the present shears is the novel form of the cutting edges 16 and 17, such edges preferably being of longitudinally curved contour as shown. Each blade is bent along a line 33 whereby the cutting edges 16 and 17 will be offset relative to the remaining portion of the associated blade. Such bending assures that the cutting edges will engage one another only in point contact, such point contact progressively moving toward the tips of the blades as they are closed and providing a clearance between the blades. Inasmuch as the contact between the cutting edges is at any instant only a point contact, friction is reduced to a minimum.

I have discovered that by making the bend along the line 33 at a constant angle throughout the length of the cutting edges but eccentric or non-parallel as shown relative to the latter, each cutting edge will comprise a three-dimensional curve with spaced points thereon disposed at different levels relative to the flat body portion of the blade. Such arrangement greatly simplifies the tooling over what would otherwise be required to produce such cutting edges.

A desirable feature resulting from bending of the blades as aforesaid is that longitudinal rigidity is imparted to the blades whereby the blades are not apt to be deformed when cutting hard or tough objects or when the shears are dropped or otherwise subjected to rough usage. It can be seen that if the blades were made perfectly flat or longitudinally arched, they or at least the tips thereof which are relatively weak would be apt to be longitudinally deformed by any such severe treatment.

Another reason for making the cutting edges 16 and 17 of a three-dimensional form as described above is to assure point contact between them especially at the tips and to obtain a more nearly uniform contact pressure between them during the entire closing movement of the blades, such uniformity being attributable at least in part to the supplementation for the progressive increase in the displacement tendency of the edges toward the tips of the blades as caused by the cams 25—26, 29—30, and 31—32. The point contact and the uniform and positive pressure engagement assures a very efficient cutting action throughout the entire closing movements of the blades.

In summary, the present improvements essentially include a novel form of handle stop means, a novel form of cam mechanism for assuring continuous engagement between the cutting edges of the blades, and a novel form of cutting edge on the blades which provides clearances so that engagement between them is along a migrating point only and which additionally imparts longitudinal rigidity to the blades. Furthermore, the novel form of cutting edges assures a more uniform contact pressure between them during the entire cutting stroke of the shears, such improved action being obtained without requiring elaborate tooling.

Other modes of applying the principle of the invention may be employed, change being made as regards the details described, provided the feature stated in any of the following claims, or the equivalent of such, be employed.

I therefore particularly point out and distinctly claim as my invention:

1. In a shears, a pair of superimposed blades formed with co-acting longitudinally extending cutting edges along their front ends, a transversely disposed pin through said blades pivotally connecting said blades together adjacent but spaced from their rear ends, said pin having an end portion extending beyond the planes of said blades, and having a pair of flanges thereon between which said blades are disposed, pivoted actuating handles for said blades including one handle member having legs pivotally connected to the respective blades at points on opposite sides of said pin and a second handle member engaging said end portion of said pin to draw said pin rearwardly whereby to actuate said blades about the pivots between said blades and said legs, and co-operating cams at the rear ends of said blades for progressively separating the rear ends of the blades about said pin as a fulcrum, and thus positively urging such edges toward each other into engagement with each other in response to actuation of said blades while imposing a forwardly tilting force on said pin acting on the flanges thereof opposing the rearwardly tilting force imposed by the engagement of said second handle member with the end portion of said pin, thus maintaining said pin normal to the plane of said blades.

2. In a shears, a pair of superimposed blades formed with co-acting longitudinally extending cutting edges along their front ends, a transversely disposed pin through said blades pivotally connecting said blades together adjacent but spaced from their rear ends, said pin having an end portion extending beyond the planes of said blades, and having a pair of flanges thereon between which said blades are disposed, pivoted actuating handles for said blades including one handle member having legs pivotally connected to the respective blades at points on opposite sides of said pin and a second handle member engaging said end portion of said pin to draw said pin rearwardly whereby to actuate said blades about the pivots between said blades and said legs, and co-operating cams at the rear ends of said blades for progressively separating the rear ends of the blades about said pin as a fulcrum, and thus positively urging such edges toward each other into engagement with each other in response to actuation of said blades while imposing a forwardly tilting force on said pin acting on the flanges thereof opposing the rearwardly tilting force imposed by the engagement of said second handle member with the end portion of said pin, thus maintaining said pin normal to the plane of said blades, said cams comprising an interfitting recess and projection on the respective blades provided with juxtaposed inclined faces whereby actuation of said blades causes such projection on one blade to move out of such recess in the other blade.

CARL SEKELY.

REFERENCES CITED

The following references are of record in the file of this patent:

UNITED STATES PATENTS

| Number | Name | Date |
|---|---|---|
| 222,672 | Conover | Dec. 16, 1879 |
| 524,673 | Bailey | Aug. 14, 1894 |
| 1,005,606 | Craig | Oct. 10, 1911 |
| 1,779,889 | Purcell | Oct. 28, 1930 |
| 1,879,488 | Rauh | Sept. 27, 1932 |
| 1,931,045 | Vasbikian et al. | Oct. 17, 1933 |
| 1,941,718 | Rasmussen | Jan. 2, 1934 |
| 1,956,588 | Parker et al. | May 1, 1934 |
| 2,105,332 | Rauh | Jan. 11, 1938 |
| 2,191,236 | McDonald | Feb. 20, 1940 |
| 2,269,587 | Hardin | Jan. 13, 1942 |
| 2,373,757 | Hart | Apr. 17, 1945 |
| 2,387,053 | Brown | Oct. 16, 1945 |

FOREIGN PATENTS

| Number | Country | Date |
|---|---|---|
| 94,806 | Germany | Aug. 14, 1896 |
| 188,827 | Germany | May 6, 1906 |
| 431,240 | Great Britain | July 3, 1935 |